United States Patent
Chou et al.

(10) Patent No.: US 7,396,619 B2
(45) Date of Patent: Jul. 8, 2008

(54) COLOR FILTER AND MANUFACTURING METHOD THEREFOR

(75) Inventors: Ching-Yu Chou, Hsinchu (TW); Chien-Hung Chen, Hsinchu (TW)

(73) Assignee: ICF Technology Co., Ltd., Hsinchu (TW)

( * ) Notice: Subject to any disclaimer, the term of this patent is extended or adjusted under 35 U.S.C. 154(b) by 0 days.

(21) Appl. No.: 11/450,257

(22) Filed: Jun. 9, 2006

(65) Prior Publication Data
US 2006/0284957 A1    Dec. 21, 2006

(30) Foreign Application Priority Data
Jun. 17, 2005    (CN) .................. 2005 1 0035395

(51) Int. Cl.
*G02B 5/20* (2006.01)
*G02F 1/1335* (2006.01)

(52) U.S. Cl. .......................... 430/7; 347/107
(58) Field of Classification Search ............. None
See application file for complete search history.

(56) References Cited

U.S. PATENT DOCUMENTS

| | | | | |
|---|---|---|---|---|
| 6,630,274 B1 * | 10/2003 | Kiguchi et al. | ............. | 430/7 |
| 2003/0118921 A1 * | 6/2003 | Chen et al. | ............. | 430/7 |

* cited by examiner

*Primary Examiner*—John A. McPherson (57) ABSTRACT

A color filter includes a transparent substrate, a black matrix formed on the transparent substrate, a plurality of banks superposed on the black matrix, and a color layer formed of R, G and B color portions. The black matrix defines a plurality of sub-pixels of the color filter. The banks and the black matrix enclose a plurality of spaces for respectively accommodating the R, G and B color portions. Wherein, a plurality of groups is defined, each group includes a plurality of sub-pixels of concolorous color portions, at least one channel is formed on the bank between adjacent sub-pixels of concolorous color portions in the group. In a manufacturing method for the color filter, the ink can flow over between the adjacent sub-pixels in a defined group and level through the channel, thus the uniformity of the color portions can be improved.

30 Claims, 6 Drawing Sheets

COLOR FILTER AND MANUFACTURING METHOD THEREFOR

BACKGROUND

1. Technical Field

The present invention relates to a color filter and a manufacturing method for the color filter and, more particularly, to a manufacturing method based on an ink jet processing method.

2. Description of the Related Art

A color filter is an important element of a liquid crystal display (LCD). The color filter is used for improving picture quality and providing a primary color to each sub-pixel of the LCD.

Figure 8:
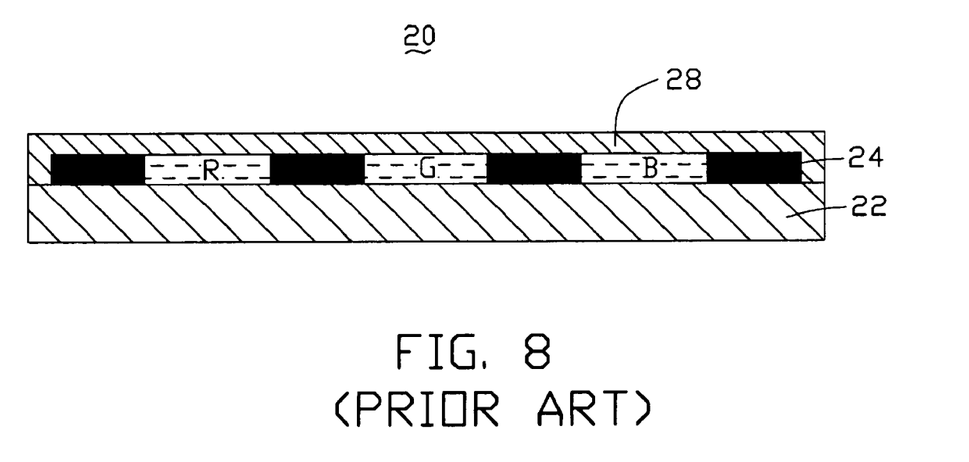
FIG. 8 is a schematic, cross-sectional view of a first conventional color filter.

Referring to FIG. 8, a first conventional color filter 20 includes a glass substrate 22, a black matrix 24 formed on a surface of the glass substrate 22, a color layer formed of red (R) color portions, green (G) color portions and blue (B) color portions, and a transparent electrically conductive layer 28 covering the black matrix 24 and the color layer. The black matrix 24 defines a plurality of sub-pixels of the color filter 20. Every sub-pixel accommodates one color portion chosen from R, G, and B color portions. The color filter 20 is generally manufactured via a method called "pigment-dispersion method". A normal process of the pigment-dispersion method has four repeated cycles. Wherein, each cycle contains a spin coating process or a slit coating process for one selected color, a pre-bake and exposing process to solidify the selected color position to be a uniform color layer, a developing process to transform the uniform color layer to be a patterned film, and a heating process to transform the patterned film to be a solidified layer. After one color cycle is finished, another color cycle is performed. Therefore, four cycles are repeated to be the black matrix, the red color layer, the blue color layer, and the green color layer. Since, total processing steps will be more than 25 steps, the processing cost is high.

Figure 9:
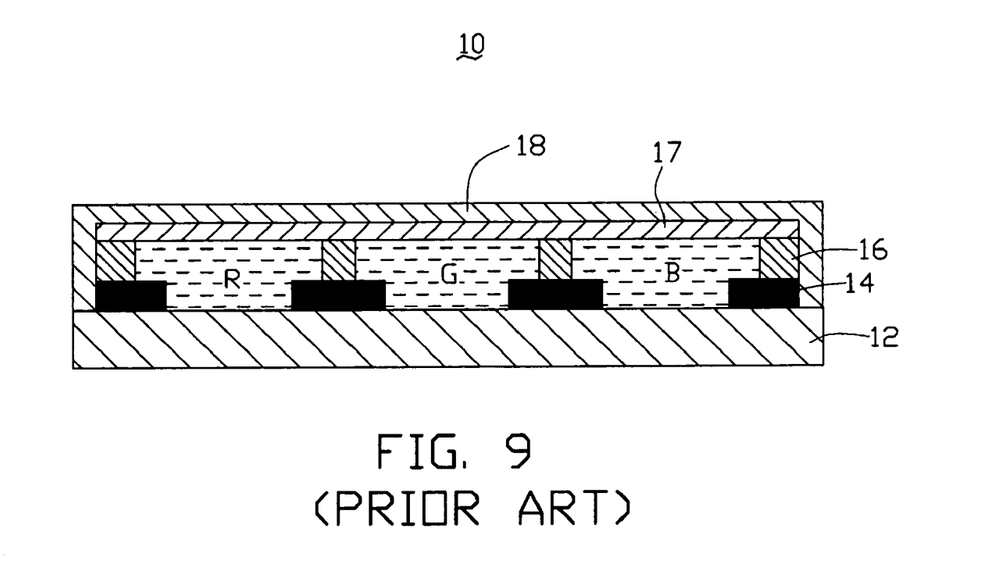
FIG. 9 is a schematic, cross-sectional view of a second conventional color filter.

A newer manufacturing method for color filters called "ink jet processing method" is developed in few years. Referring to FIG. 9, a second conventional color filter 10 made by the ink jet processing method includes a glass substrate 12, a black matrix 14 formed on a surface of the glass substrate 12, a plurality of banks 16 superposed on the black matrix 14, a color layer formed of R, G, and B color portions, an overcoat layer 17 covering the banks 16 and the color layer, and a transparent electrically conductive layer 18 covering the overcoat layer 17. The black matrix 14 defines a plurality of sub-pixels of the color filter 10. The banks 16 and the black matrix 14 enclose a plurality of spaces each for accommodating one color portion chosen from R, G, and B color portions. This structure is often seen if the manufacturing method is the ink jet processing method. The banks 16 are especially useful in order to prevent adjacent ink from being mixed during manufacturing.

The ink jet processing method mainly includes a step of jetting ink drop by drop onto a transparent substrate by an ink jet head to deposit the ink on a prescribed space. Then the ink in the space is dried and becomes a color portion. The ink jet processing method simplifies the manufacturing process of the color filters and reduces production cost. In order to ensure the uniformity of the color portions, each space must be jetted into a consistent amount of the ink. For example, each of the spaces is jetted into equal drops of the ink.

However, during the jetting process, the ink jet head maybe does not jet for some reason, though the ink jet head ought to jet. In addition, the volume of a jetted drop maybe does not equal to the standard volume of a drop, for example, when a drop of the ink contains air bubble. These can cause the nonuniformity of the color portions, even cause the defects of the color filter.

What is needed, therefore, is a color filter with a good uniformity of color portions, and a manufacturing method that can improve the quality of the color filter.

SUMMARY

A color filter according to an embodiment includes a transparent substrate having a surface, a black matrix formed on the surface of the transparent substrate, a plurality of banks superposed on the black matrix, and a color layer formed of R, G and B color portions. The black matrix defines a plurality of sub-pixels of the color filter. The banks and the black matrix enclose a plurality of spaces. Each of the R, G and B color portions is accommodated in one of the spaces. Wherein, a plurality of groups is defined, each group includes a plurality of sub-pixels of concolorous color portions. At least one channel is formed on the bank between adjacent sub-pixels of concolorous color portions in the group, and/or a height of the bank between adjacent sub-pixels of concolorous color portions in the group is smaller than that of the banks between adjacent sub-pixels outside the group.

A manufacturing method for a color filter according to an embodiment includes the steps of providing a transparent substrate having an upper surface; forming a black matrix on the upper surface of the transparent substrate, wherein the black matrix defines a plurality of sub-pixels of the color filter; forming a plurality of banks superposed on the black matrix, wherein a plurality of groups is defined, each group includes a plurality of sub-pixels of concolorous color portions, at least one channel is formed on the bank between adjacent sub-pixels of concolorous color portions in a group and/or a height of the bank between adjacent sub-pixels of concolorous color portions in a group is smaller than that of the banks between adjacent sub-pixels outside the group; jetting ink into spaces defined by the banks via an ink jet device, wherein the ink can flow over between the adjacent sub-pixels in a group and level through the channel or the lower bank with smaller height, solidifying the ink to form a color layer of R, G, and B color portions.

Other advantages and novel features will become more apparent from the following detailed description of the present color filter and manufacturing method, when taken in conjunction with the accompanying drawings.

BRIEF DESCRIPTION OF THE DRAWINGS

Many aspects of the present color filter and manufacturing method can be better understood with reference to the following drawings. The components in the drawings are not necessarily to scale, the emphasis instead being placed upon clearly illustrating the principles of the present color filter and manufacturing method. Moreover, in the drawings, like reference numerals designate corresponding parts throughout the several views.

DETAILED DESCRIPTION OF PREFERRED EMBODIMENTS

Reference will now be made to the drawings to describe preferred embodiment of the color filter and its manufacturing method, in detail.

Figure 1:
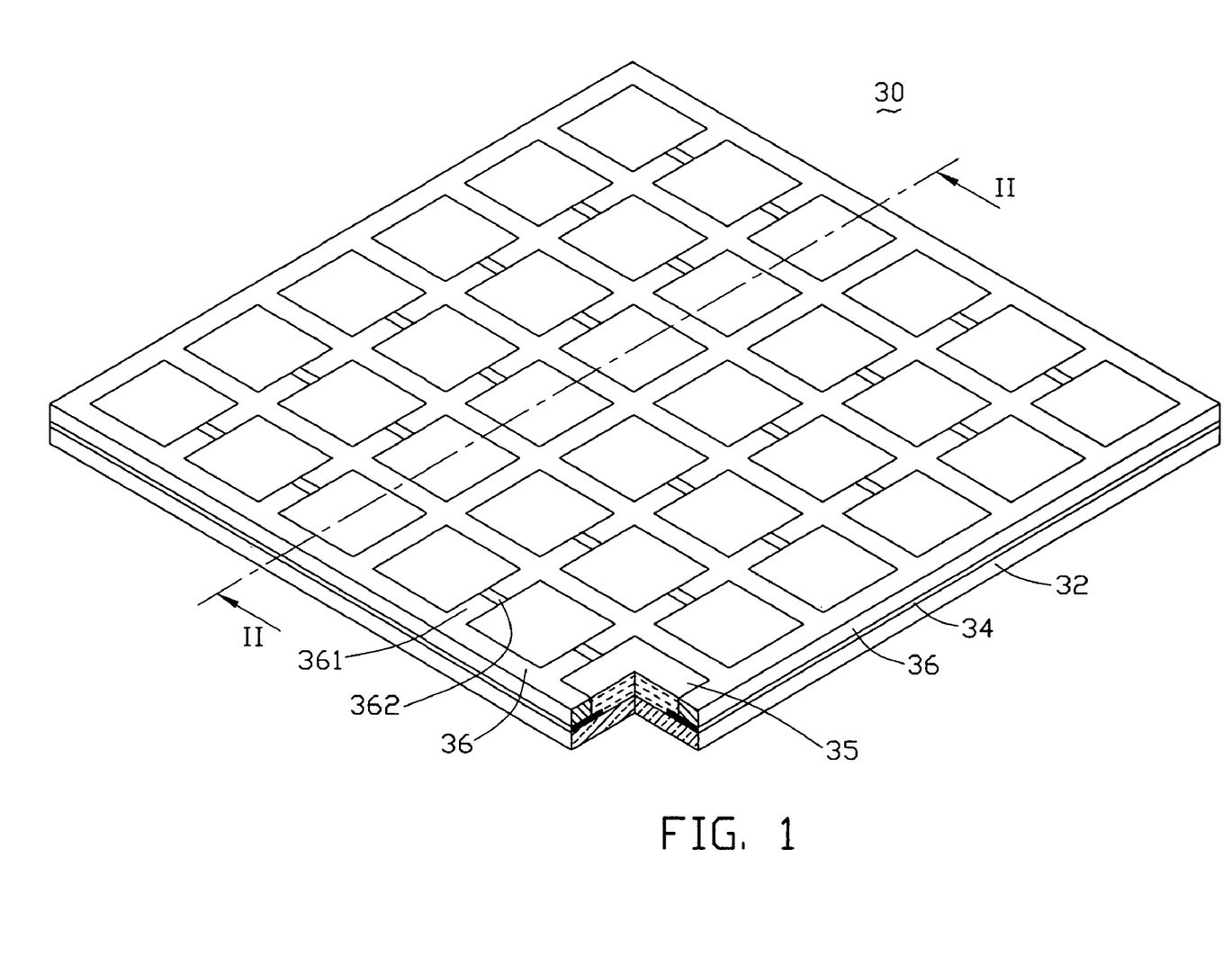
FIG. 1 is a schematic, cut-away view of a color filter in accordance with a first embodiment.
Figure 2:
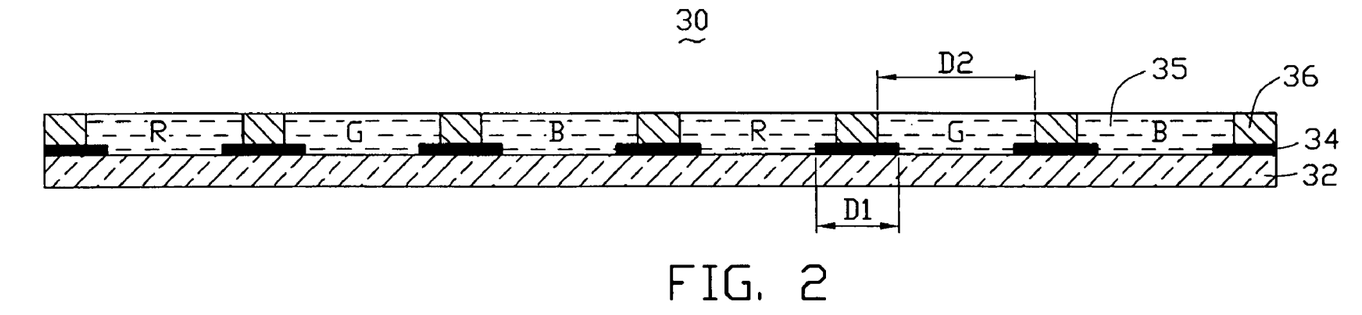
FIG. 2 is a schematic, cross-sectional view taken along line II-II of FIG. 1.

Referring to FIGS. 1 and 2, a color filter 30 in accordance with a first embodiment is shown. The color filter 30 includes a transparent substrate 32, a black matrix 34 formed on a surface of the transparent substrate 32, a plurality of banks 36 and 361 superposed on the black matrix 34, and a color layer formed of R, G, and B color portions 35. The black matrix 34 defines a plurality of sub-pixels of the color filter 30. The banks 36 and the black matrix 34 define a plurality of spaces for respectively accommodating the R, G, and B color portions 35. The cross-sectional width D1 of the black matrix 34 is generally equal to or larger than that of the bank 36. In this embodiment, the cross-sectional width D1 of the black matrix 34 is larger than that of the bank 36. The width D1 of the black matrix 34 is about 20 micrometer, and the distance D2 between two adjacent banks 36 is about 90 micrometer.

Figure 3:
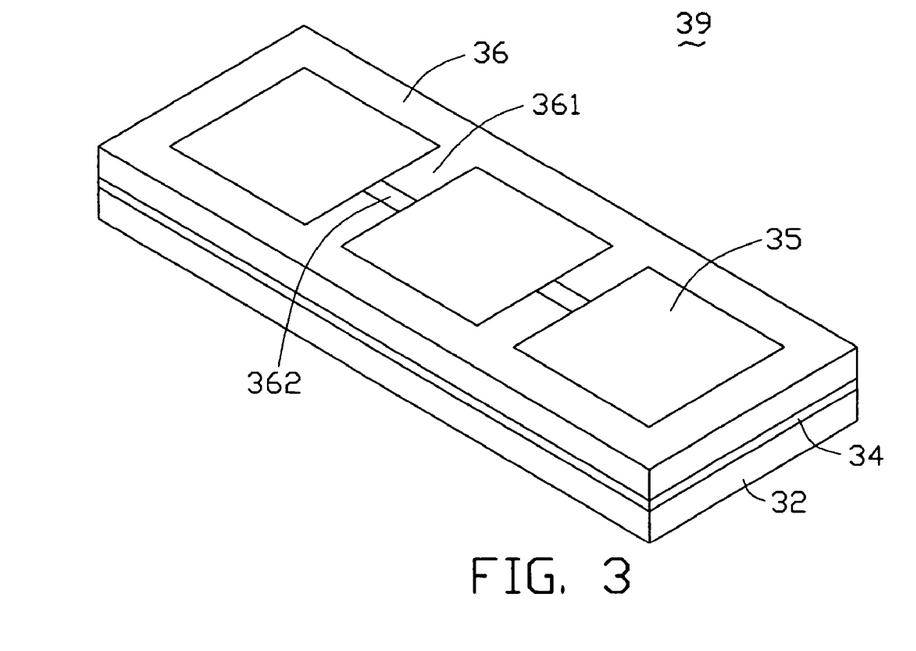
FIG. 3 is a schematic, perspective view of a group including sub-pixels of concolorous color potions of FIG. 1.

Referring to FIG. 3, a group 39 is defined and shown. The group 39 includes a plurality of sub-pixels of concolorous color portions 35 enclosed by the black matrix 34 and the banks 36. At least one channel 362 is formed on an upper portion of the bank 361 between adjacent sub-pixels of concolorous color portions in a group. The channel 362 is used for communicating two adjacent sub-pixels accommodating the concolorous color portions 35. The amount of the sub-pixels of concolorous color portions 35 in the group 39 can be equal to or less than ten. In this embodiment, the amount of sub-pixels of the concolorous color portions 35 in the group 39 is three.

Figure 4:
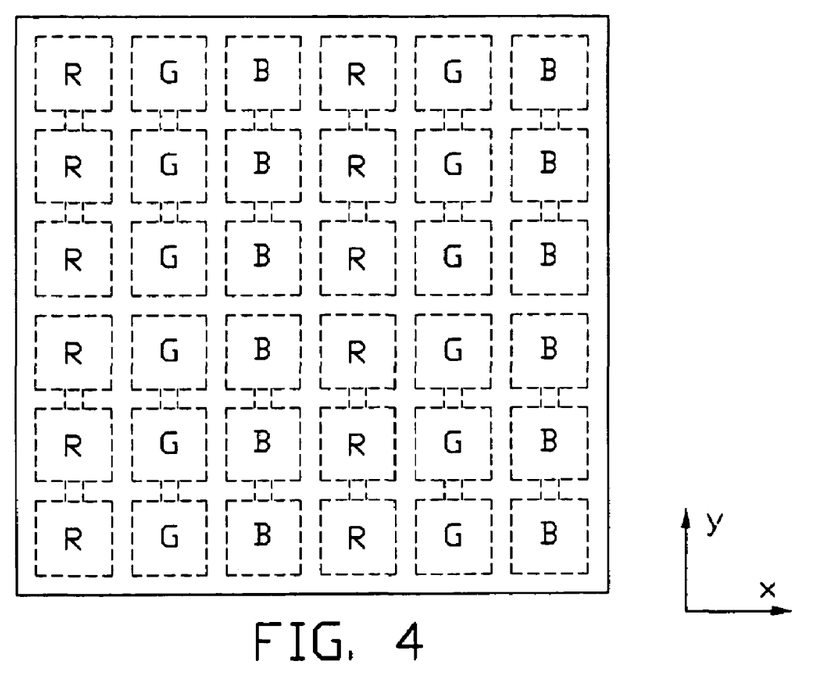
FIG. 4 is a schematic, plan view of a first arrangement of R, G, and B color potions of FIG. 1.

Referring to FIG. 4, a first arrangement of the R, G, and B color potions 35 of the color filter 30 is shown. Specifically, the concolorous color portions 35 are aligned in the direction of Y-axis, and the color order of the color portions 35 in the direction of X-axis is repeating R-G-B.

Figure 5:
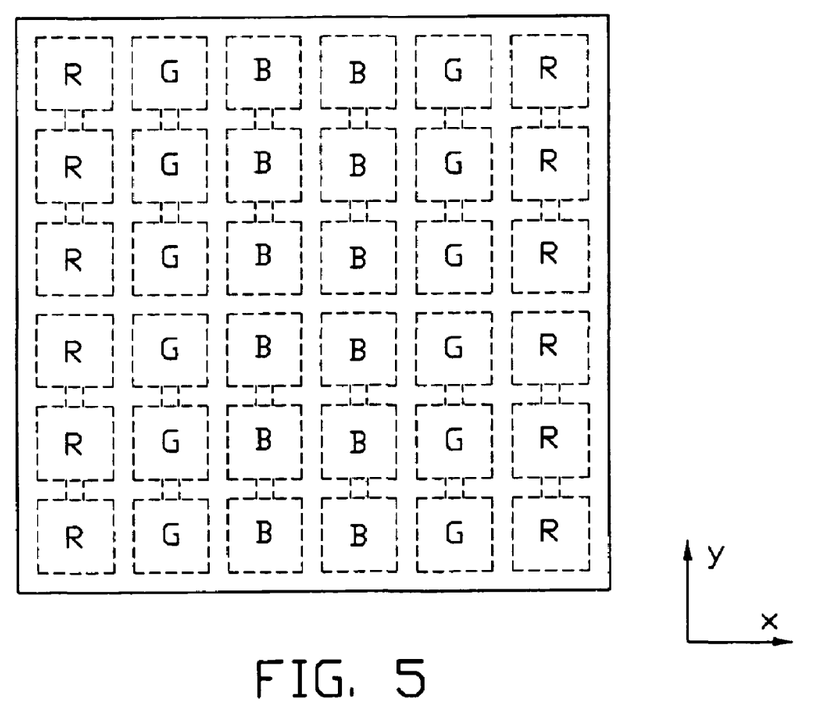
FIG. 5 is a schematic, plan view of a second arrangement of R, G, and B color potions of FIG. 1.

Referring to FIG. 5, a second arrangement of the R, G, and B color potions 35 of the color filter 30 is shown. Specifically, the concolorous color portions 35 are aligned in the direction of Y-axis, and the color order of the color portions 35 in the direction of X-axis is repeating R-G-B-B-G-R. In addition, other arrangements of the R, G, and B color potions 35 can also be used in the present color filter 30.

Figure 6:
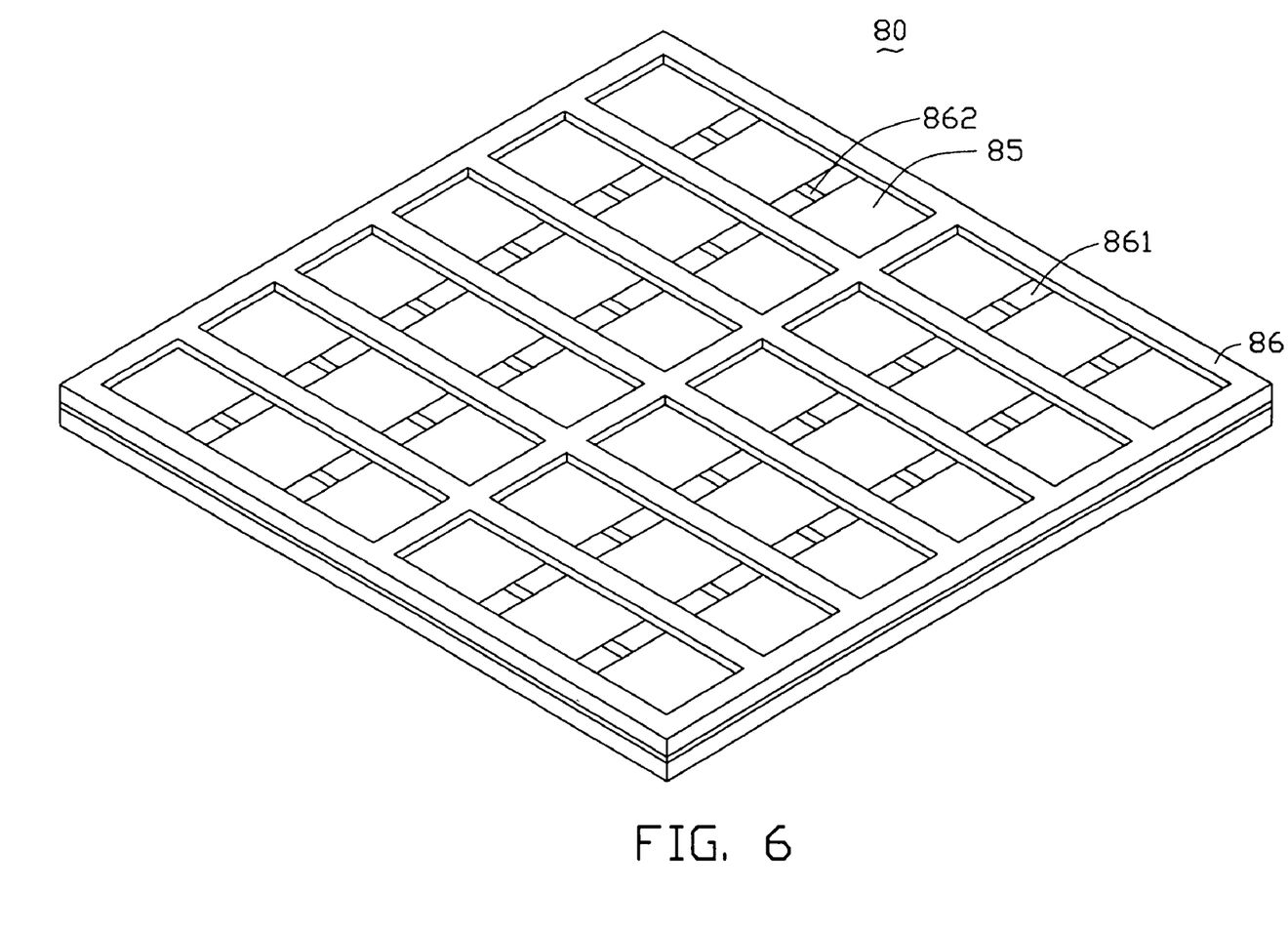
FIG. 6 is a schematic, perspective view of a color filter in accordance with a second embodiment.

Referring to FIG. 6, a color filter 80 in accordance with a second embodiment is shown. The color filter 80 is similar to the color filter 30 of the first embodiment. The difference is that height of banks 861 between sub-pixels of the concolorous color portions 85 in a group is smaller than that of banks 86 between adjacent sub-pixels outside the group. The advantage of this structure is that the flow-over speed of ink will be enhanced when a large amount of ink is applied.

The present color filter can further include an overcoat layer (e.g., overcoat layer 17 in FIG. 9) covering the banks and the color layer. The overcoat layer is used for protecting the color layer and improving the smoothness of the surface of the color filter. Preferably, the overcoat layer can be made of polymeric material selected from the group consisting of epoxy resin series, acrylic resin series, polyimide resin series, and polyvinyl alcohol resin series. The present color filter can further include an electrically conductive layer (e.g., electrically conductive layer 18 in FIG. 9) covering the overcoat layer, or the banks and the color layer. The electrically conductive layer can be a transparent electrically conductive layer or a metal electrically conductive layer. Preferably, the transparent electrically conductive layer can be an indium tin oxide film, and the metal electrically conductive layer can be an aluminum film.

The advantages of the present color filter will be described with reference to its manufacturing method as below.

Figure 7:
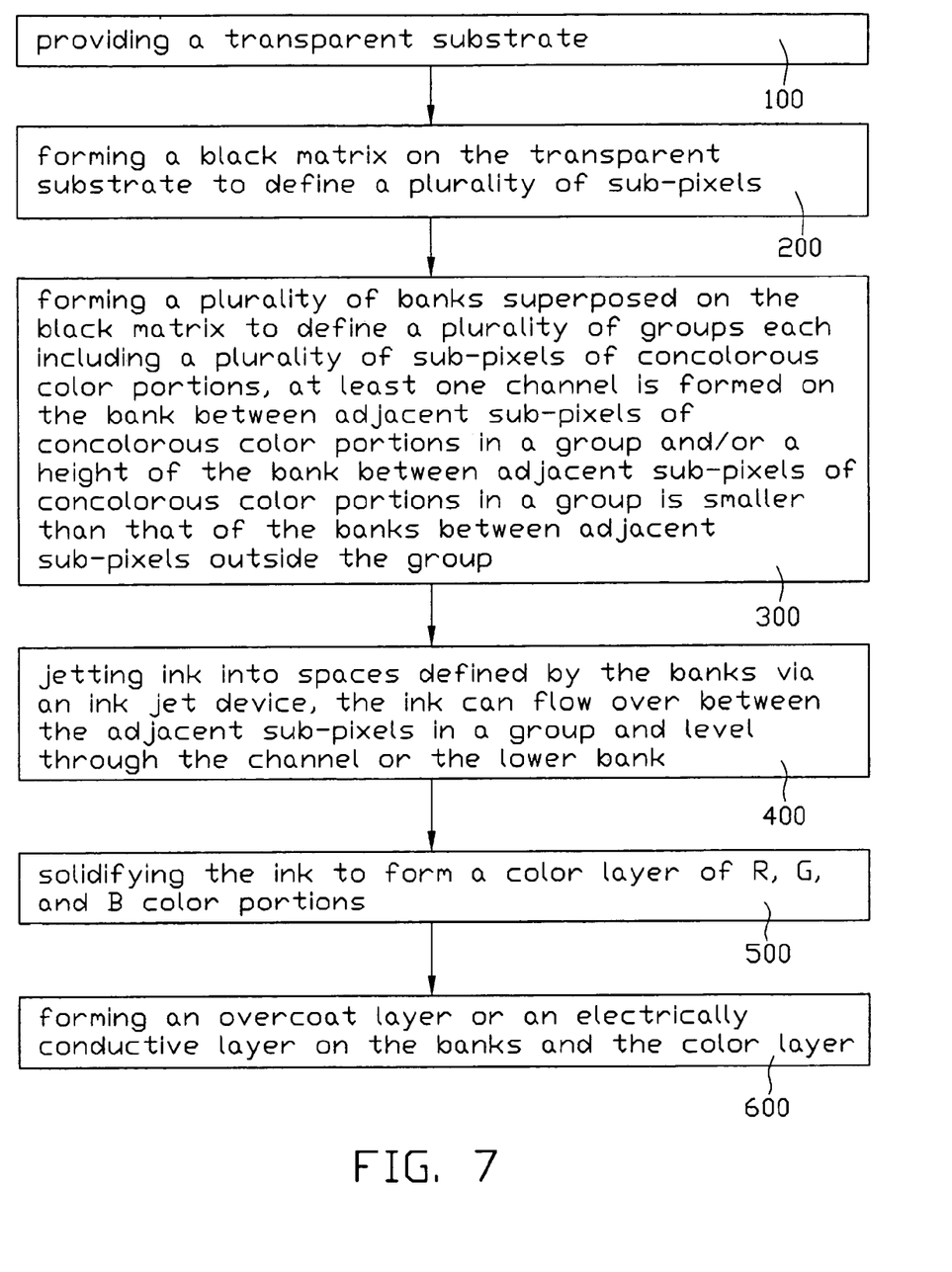
FIG. 7 is a flowchart of a manufacturing method of a color filter in accordance with a third embodiment.

Referring to FIG. 7, a flowchart of a manufacturing method of the present color filters in accordance with a preferred embodiment is shown. The manufacturing method mainly includes the following steps: providing a transparent substrate such as a glass substrate (step 100); forming a black matrix on an upper surface of the transparent substrate, wherein the black matrix defines a plurality of sub-pixels of the color filter (step 200); forming a plurality of banks superposed on the black matrix, wherein a plurality of groups is defined, each group includes a plurality of sub-pixels of concolorous color portions. At least one channel is formed on the bank between adjacent sub-pixels of concolorous color portions in a group, and/or a height of the bank between adjacent sub-pixels of concolorous color portions in a group is smaller than that of the banks between adjacent sub-pixels outside the group (step 300); jetting ink into spaces defined by the banks via an ink jet device, wherein the ink can flow over between the adjacent sub-pixels in a group and level through the channel or the lower bank with smaller height (step 400); solidifying the ink to form a color layer of R, G, and B color portions (step 500); and forming an overcoat layer or an electrically conductive layer on the banks and the color layer (step 600).

In step 200, the black matrix is made by the following steps: coating an organic black negative type photoresist film onto the upper surface of the transparent substrate using a slit coater or a spin coater; exposing the photoresist film via a photomask; developing the unexposed portions of the photoresist film and forming the black matrix. As known in the art, an organic black positive type photoresist film and a complementary photomask can also be used for making the black matrix.

In addition, in step 200, the black matrix can be also made by the following steps: depositing a chromium film on the upper surface of the transparent substrate using an evaporation process or a sputtering process; coating a positive type photoresist film onto an upper surface of the chromium film; exposing the photoresist film via a photomask; developing the exposed portions of the photoresist film; removing the portions of the chromium film between the residual photoresist film using an etching process; removing the residual photoresist film using remover such as stripper to form the black matrix. A film of chromium alloy can also be used instead of the chromium film. As known in the art, a negative type photoresist film and a complementary photomask can also be used for making the black matrix.

In step 300, the banks are made by the following steps: coating a negative type photoresist film for forming banks onto the upper surface of the transparent substrate with black matrix using a dry film lamination method, a wet spin coating method or a wet slit coating method, wherein the photoresist film also covers the black matrix formed on the upper surface of the transparent substrate; exposing the photoresist film via a photomask with a pattern corresponding to the banks of the color filter; developing the unexposed portions of the photoresist film and forming the banks with channels, wherein the portion of the photomask corresponding to the channel can be a dark portion or a gray level portion, so that the resultant channel has a desirable depth. The banks with different heights can also be made using a photomask with gray level portions. In addition, the banks with different heights can also be made by performing the exposing and developing process twice. A positive type photoresist film for forming banks can also be used instead of the negative type photoresist film for forming banks.

In step 400, an ink jet device is used for putting the R, G and B ink into the spaces either by jetting one color ink at a time and repeating three times (in turn) or jetting three color ink at the same time. The ink flows over from one space into anther adjacent space through the channel or the lower bank. The ink jet device can be a thermal bubble ink jet printing apparatus or a piezoelectric ink jet printing apparatus.

In step 500, the ink is solidified by one or more solidifying device, such as vacuumizing devices and/or heating devices and/or light-emitting devices to form the color layer.

In step 600, an overcoat layer or an electrically conductive layer is formed on the banks and the color layer. Besides, the portion of the banks higher than the color layer can be removed by a grinding method or an etching method before the overcoat layer or the electrically conductive layer is formed thereon. The all banks can also be removed using remover such as stripper. The overcoat layer can be coated using a slit coating process or a spin coating process. The electrically conductive layer can be deposited using a sputtering process. In addition, the overcoat layer and the electrically conductive layer can be formed on the banks and the color layer sequentially.

Because the ink can flow over between the adjacent sub-pixels in a defined group and level through the channel or the lower bank with smaller height, the uniformity of the color portions can be improved. Also, as known in the art, when ink is fixed, one thickness corresponds to a particular color. The thickness of concolorous portion can be changed more like continuously than conventional ink jet processing method through grouping, so that the variety of color can be more without changing ink. Please see the following table, there is only two choices when the thickness of concolorous portion between 1.2 μm to 1.6 μm without grouping. In contrast, by grouping 3 sub-pixels, the choice increases to 4 when the thickness of concolorous portion between 1.2 μm to 1.6 μm. The number of group increases, the number of color choices increases.

|  |  | Number of Ink Jet Drops on Sub-pixels | |
|---|---|---|---|
| Conventional Ink Jet Processing method | | | |
| No Grouping | Sub-Pixel No. 1 | 3 | 4 |
|  | Sub-Pixel No. 2 | 3 | 4 |
|  | Sub-Pixel No. 3 | 3 | 4 |
| -continued | | | | | |
|  |  | Number of Ink Jet Drops on Sub-pixels | | | |
| Thickness of Concolorous portion (μm) | | 1.2 | | 1.6 | |
| Current Invention with Grouping Design | | | | | |
| Grouping Sub-pixels No. 1 & No. 2 & No. 3 | Sub-Pixel No. 1 | 3 | 3 | 3 | 4 |
|  | Sub-Pixel No. 2 | 3 | 4 | 4 | 4 |
|  | Sub-Pixel No. 3 | 3 | 3 | 4 | 4 |
| Thickness of Concolorous portion (μm) | | 1.2 | 1.33 | 1.46 | 1.6 |

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A color filter, comprising:
   a transparent substrate having a surface;
   a black matrix fanned on the surface of the transparent substrate to define a plurality of sub-pixels of the color filter;
   a plurality of banks superposed on the black matrix, the banks and the black matrix defining a plurality of spaces;
   a color layer formed of red, green and blue color portions, each of the red, green and blue color portions being accommodated in one of the spaces; and
   a plurality of groups being defined, wherein each group includes a plurality of sub-pixels of concolorous color portions, at least one channel is formed on the bank between adjacent sub-pixels of concolorous color portions in the group, each channel being configured for communicating between a pair of adjacent sub-pixels.

2. The color filter as claimed in claim 1, wherein the amount of sub-pixels of concolorous color portions in each group is equal to or less than ten.

3. The color filter as claimed in claim 1, wherein the width of the bank is equal to or smaller than that of the black matrix.

4. The color filter as claimed in claim 1, further comprising an overcoat layer covering the banks and the color layer.

5. The color filter as claimed in claim 4, wherein the overcoat layer is made of a polymeric material selected from the group consisting of epoxy resin series, acrylic resin series, polyimide resin series, and polyvinyl alcohol resin series.

6. The color filter as claimed in claim 4, further comprising an electrically conductive layer covering the overcoat layer.

7. The color filter as claimed in claim 6, wherein the electrically conductive layer is one of a transparent electrically conductive layer and a metal electrically conductive layer.

8. The color filter as claimed in claim 7, wherein the transparent electrically conductive layer is an indium tin oxide film, the metal electrically conductive layer is an aluminum film.

9. The color filter as claimed in claim 1, further comprising an electrically conductive layer covering the banks and the color layer.

10. The color filter as claimed in claim 9, wherein the electrically conductive layer is one of a transparent electrically conductive layer and a metal electrically conductive layer.

11. The color filter as claimed in claim 10, wherein the transparent electrically conductive layer is an indium tin oxide film, the metal electrically conductive layer is an aluminum film.

12. The color filter as claimed in claim 1, wherein each group includes a plurality of sub-pixels of concolorous color portions in linear arrangement.

13. The color filter as claimed in claim 1, wherein a height of the bank between adjacent sub-pixels of concolorous color portions in the group is smaller than that of the banks between adjacent sub-pixels outside the group.

14. A manufacturing method for a color filter, comprising the steps of:

providing a transparent substrate having an upper surface;

forming a black matrix on the upper surface of the transparent substrate, wherein the black matrix defines a plurality of sub-pixels of the color filter;

forming a plurality of banks superposed on the black matrix, wherein a plurality of groups is defined, each group includes a plurality of sub-pixels of concolorous color portions, at least one channel is formed on the bank between adjacent sub-pixels of concolorous color portions in a group, each channel being configured for communicating between a pair of adjacent sub-pixels;

jetting ink into spaces defined by the banks via an ink jet device, wherein the ink can flow over between the adjacent sub-pixels in the each group and level through the channel; and solidifying the ink to form a color layer of red, green and blue color portions.

15. The manufacturing method as claimed in claim 14, wherein the black matrix is made by the following steps:

coating an organic black photoresist film onto the upper surface of the transparent substrate;

exposing the photoresist film via a photomask;

developing unnecessary portions of the photoresist film and forming the black matrix.

16. The manufacturing method as claimed in claim 14, wherein the black matrix is made by the following steps:

depositing a metal film containing chromium on the upper surface of the transparent substrate using an evaporation process or a sputtering process;

coating a photoresist film onto an upper surface of the metal film;

exposing the photoresist film via a photomask;

developing the unnecessary portions of the photoresist film;

removing the portions of the metal film between the residual photoresist film using etching process;

removing the residual photoresist film using remover to form the black matrix.

17. The manufacturing method as claimed in claim 14, wherein the banks are made by the following steps:

coating a photoresist film for forming banks onto the upper surface of the transparent substrate, wherein the photoresist film also covers the black matrix;

exposing the photoresist film via a photomask with a pattern corresponding to the banks of the color filter;

developing the unnecessary portions of the photoresist film and forming the banks with the channels.

18. The manufacturing method as claimed in claim 14, wherein a height of the bank between adjacent sub-pixels of concolorous color portions in a group is smaller than that of the banks between adjacent sub-pixels outside the group, and the banks with different heights are made by performing exposing and developing process twice.

19. The manufacturing method as claimed in claim 18, wherein the banks with different heights are made using a gray level photomask.

20. The manufacturing method as claimed in claim 14, wherein red, green and blue ink are jetted into the spaces in turn in the jetting process.

21. The manufacturing method as claimed in claim 14, wherein red, green and blue ink are respectively jetted into the spaces at the same time in the jetting process.

22. The manufacturing method as claimed in claim 14, wherein the ink jet device is a thermal bubble ink jet printing apparatus or a piezoelectric ink jet printing apparatus.

23. The manufacturing method as claimed in claim 14, wherein the ink is solidified by one or more solidifying devices selected from vacuumizing devices, heating devices, and light-emitting devices to form the color layer.

24. The manufacturing method as claimed in claim 14, further comprising the step of: forming an overcoat layer or an electrically conductive layer on the banks and the color layer.

25. The manufacturing method as claimed in claim 24, wherein the portion of the banks higher than the color layer is removed by a grinding method or an etching method before the overcoat layer or the electrically conductive layer is formed thereon.

26. The manufacturing method as claimed in claim 14, further comprising the step of: forming an overcoat layer and an electrically conductive layer on the banks and the color layer sequentially.

27. The manufacturing method as claimed in claim 26, wherein the portion of the banks higher than the color layer is removed by a grinding method or an etching method before the overcoat layer and the electrically conductive layer is formed thereon.

28. The manufacturing method as claimed in claim 14, wherein each group includes a plurality of sub-pixels of concolorous color portions in liner arrangement.

29. The manufacturing method as claimed in claim 14, further comprising the steps of: removing all the banks using remover, forming an overcoat layer or an electrically conductive layer on the black matrix and the color filter.

30. The manufacturing method as claimed in claim 14, further comprising the steps of: removing all the banks using remover, forming an overcoat layer and an electrically conductive layer on the black matrix and the color filter sequentially.

* * * * *